United States Patent [19]

Halconruy et al.

[11] Patent Number: 4,718,680
[45] Date of Patent: Jan. 12, 1988

[54] BELLOWS SEALING SHEATH FOR ARTICULATED JOINTS

[75] Inventors: Hubert T. Halconruy, Versailles; Jean-Michel F. Tixier, Montrouge, both of France

[73] Assignees: Automobiles Peugeot, Paris; Automobiles Citroen, Neuilly sur Seine, both of France

[21] Appl. No.: 34,109

[22] Filed: Apr. 2, 1987

[30] Foreign Application Priority Data

Apr. 11, 1986 [FR] France .................... 86 05402

[51] Int. Cl.⁴ ............................ F16J 3/04; F16J 15/52
[52] U.S. Cl. .............................. 277/212 FB; 464/175; 74/18.1; 403/50
[58] Field of Search ......... 277/212 R, 212 F, 212 FB; 74/18, 18.1, 18.2; 403/50, 51; 464/133, 175, 173

[56] References Cited

U.S. PATENT DOCUMENTS

| | | | |
|---|---|---|---|
| 2,983,125 | 5/1961 | Peickii et al. | 464/173 |
| 3,362,193 | 1/1968 | Ritsema | 277/212 FB X |
| 3,472,540 | 10/1969 | Gottschald | 277/212 FB X |
| 4,107,952 | 8/1978 | Geisthoff | 464/175 |

FOREIGN PATENT DOCUMENTS 1154006  9/1963  Fed. Rep. of Germany ...... 277/212 FB

*Primary Examiner*—Robert S. Ward
*Attorney, Agent, or Firm*—Karl F. Ross; Herbert Dubno

[57] ABSTRACT

A bellows sealing sheath for an articulated joint including a bellows which connects together two sleeves intended to be mounted respectively on the driving element and on the driven element and which includes an inner ring in the extension of the first fold on the same side as one of the elements, wherein a deflector is mounted on the other element, on the same side as the first element with respect to the inner ring, while being firmly secured to this other element and having no contact with the ring.

1 Claim, 1 Drawing Figure

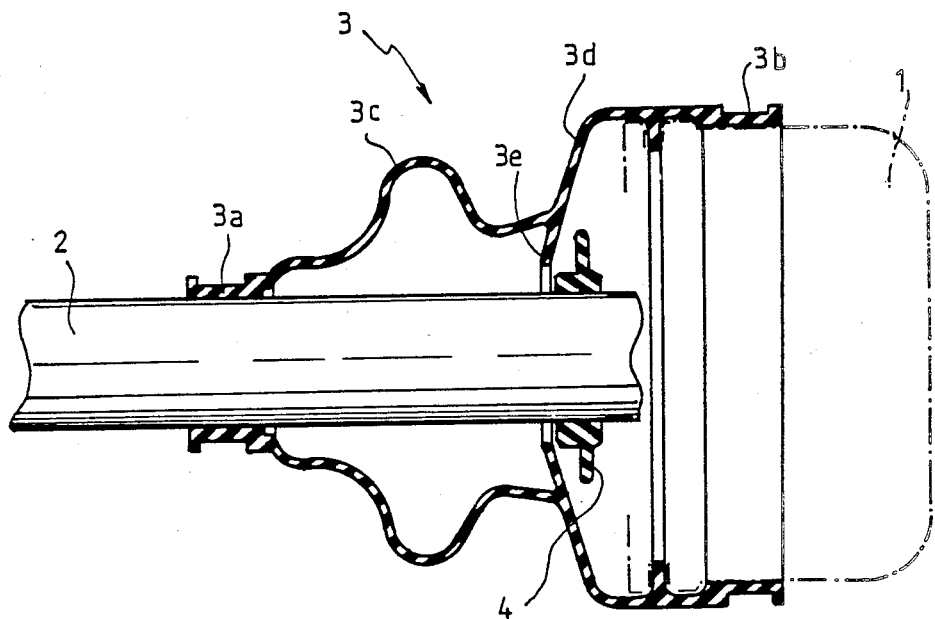

BELLOWS SEALING SHEATH FOR ARTICULATED JOINTS

BACKGROUND OF THE INVENTION

Articulated joints must be permanently lubricated; such lubrication is provided by means of grease enclosed in a bellows sealing sheath surrounding the joint.

The amount of grease enclosed in the sealing sheaths at present provided is very high, of the order of 130 to 160 g for a universal joint situated at the side of the gear box of a medium price range vehicle. When the speed of the rotation of the joint is high, the centrifugal force exerted on the grease is high and has harmful effects on the sheath.

In order to reduce the amount of grease contained in the joint the dimensions of the sheath could be reduced, but the bellows would then be closer to the shafts connected together by the joints, which would involve a risk of abrasion. It has also be proposed to provide rings outside the sheath; but the problems of abrasion also arise in this case, since the rings rub against the bottom of the folds of the bellows.

French Pat. No. 1 465 613 describes a bellows sealing sheath including a bellows which connects together two sleeves intended to be mounted respectively on the driving element and on the driven element and which have an inner ring in the extension of the first fold at the side of one of the elements. This ring makes the joint rigid so that it withstands well the effects of the centrifugal force.

SUMMARY OF THE INVENTION

The present invention relates to an improvement made to the sealing sheaths of this type which reduces the amount of grease required and further increases the resistance of the sheath to the effects of the centrifugal force.

In the sheath of the invention, a deflector is mounted on the other element, on the first element side with respect to the inner ring, while being integrally fixed to this other element and having no contact with the ring.

This deflector and the inner ring form a baffle which provides an appreciable pressure drop between the two sides of the sheath while keeping the flexibility of movement of the bellows.

BRIEF DESCRIPTION OF THE DRAWING

One embodiment of the sealing sheath of the invention will be described hereafter, by way of non limitative example, with reference to the single FIGURE which is a sectional view of this joint.

DESCRIPTION OF THE PREFERRED EMBODIMENT

In the drawing are shown a driving element 1, for example a bowl, and a drive element 2, for example a shaft, which are connected together by an articulated transmission joint; this latter is covered by a sealing sheath designated as a whole by the reference 3 and containing grease.

Sheath 3 has a sleeve 3a of small diameter mounted on shaft 2, a sleeve 3b of larger diameter which is mounted on the bowl 1, and a bellows 3c which connects the two sleeves together. This bellows includes, in the extension of the first fold 3d on the bowl side, an inner ring 3e which is not in contact with the shaft.

A deflector 4, which has a form of revolution and may for example be made from rubber, is disposed on shaft 2 on the bowl 1 side with respect to the inner ring 3e, without being in contact with this ring; this deflector is securely fixed to the shaft, for example by being force fitted thereon.

Since the inner ring 3e and deflector 4 have no mechanical deflection, the original flexibility of the bellows is only but little affected by the free movement of the joint. The amount of grease may be reduced, which results in a saving of weight and contributes to reducing the extent to which the sheath is thrown off center under the effect of the centrifugal force.

Since the grease is concentrated by the baffle formed by ring 3e and deflector 4 in the vicinity of the moving parts, the arrangement is more efficient.

It goes without saying that the present invention should not be considered as limited to the embodiment described and shown but covers, on the contrary all variants thereof.

What is claimed is:

1. A bellows sealing sheath for an articulated joint including a bellows which connects together two sleeves intended to be mounted respectively on the driving element and on the driven element and which includes an inner ring in the extension of the first fold on the same side as one of the elements, wherein a deflector is mounted on the other element, on the same side as the first element with respect to the inner ring, while being firmly secured to this other element and having no contact with the ring.

* * * * *